US009635016B2

United States Patent
Liu et al.

(10) Patent No.: US 9,635,016 B2
(45) Date of Patent: *Apr. 25, 2017

(54) CYBER GENE IDENTIFICATION TECHNOLOGY BASED ON ENTITY FEATURES IN CYBER SPACE

(71) Applicants: Nanjie Liu, Nanjing (CN); Haitao Zhao, Nanjing (CN)

(72) Inventors: Nanjie Liu, Nanjing (CN); Haitao Zhao, Nanjing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/959,372

(22) Filed: Dec. 4, 2015

(65) Prior Publication Data

US 2016/0087969 A1    Mar. 24, 2016

Related U.S. Application Data

(63) Continuation of application No. 14/326,164, filed on Jul. 8, 2014, now Pat. No. 9,253,181.

(51) Int. Cl.
*H04L 29/06* (2006.01)
*H04L 29/12* (2006.01)
*H04L 29/08* (2006.01)
*H04W 12/06* (2009.01)

(52) U.S. Cl.
CPC ...... *H04L 63/083* (2013.01); *H04L 29/12207* (2013.01); *H04L 29/12716* (2013.01); *H04L 61/20* (2013.01); *H04L 61/3065* (2013.01); *H04L 63/08* (2013.01); *H04L 63/20* (2013.01); *H04L 67/303* (2013.01); *H04W 12/06* (2013.01)

(58) Field of Classification Search
CPC ...................................................... H04L 63/20
See application file for complete search history.

(56) References Cited

U.S. PATENT DOCUMENTS

| | | | | |
|---|---|---|---|---|
| 6,847,948 | B1 * | 1/2005 | Paolini | G06Q 30/018 380/277 |
| 7,764,308 | B2 * | 7/2010 | Kusaka | H04N 1/00477 348/207.1 |
| 2005/0216736 | A1 * | 9/2005 | Smith | H04L 63/166 713/168 |
| 2006/0105745 | A1 * | 5/2006 | Frank | G06F 21/31 455/411 |
| 2013/0185176 | A1 * | 7/2013 | Anchala | G06Q 30/02 705/27.1 |

OTHER PUBLICATIONS

Buyya, Rajkumar, Chee Shin Yeo, and Srikumar Venugopal. "Market-oriented cloud computing: Vision, hype, and reality for delivering it services as computing utilities." High Performance Computing and Communications, 2008. HPCC'08. 10th IEEE International Conference on. Ieee, 2008.*

\* cited by examiner

*Primary Examiner* — Shawnchoy Rahman

(57) ABSTRACT

A new identification (ID) technology comprising unified and standardized object identification within Cyber Space is disclosed based upon intrinsic properties of the entity to be identified. This Cyber Gene ID (or Cyber ID) technology extracts intrinsic information from either the physical users or their cyberspace counterparts, and such information is categorized into client parameters, dynamic parameters, static parameters, cloud parameters, connection parameters and user parameters.

19 Claims, 2 Drawing Sheets

CYBER GENE IDENTIFICATION TECHNOLOGY BASED ON ENTITY FEATURES IN CYBER SPACE

CROSS-REFERENCE TO RELATED APPLICATIONS

The present application is a Continuation of U.S. application Ser. No. 14/326,164, filed Jul. 8, 2014, entitled "CYBER GENE IDENTIFICATION TECHNOLOGY BASED ON ENTITY FEATURES IN CYBER SPACE" and which is incorporated herein by reference and for all purposes.

BACKGROUND OF THE INVENTION

Field of the Invention

The present invention relates to a new identification technology that achieves unified and standardized object identification within Cyber Space. This technology achieves those mentioned above by extracting intrinsic information from either the physical user or their cyberspace counterpart. Such information is categorized into client parameters, dynamic parameters, static parameters, cloud parameters, connection parameters and user parameters. This ID (identification) technology is based upon intrinsic properties of the entity to be identified, and we will call this Cyber Gene ID (or Cyber ID).

Using this technology, a person can achieve one to one projection of objects within the Physical Space and objects within the Cyber Space. Such projection will also be two way and can be used to solve current core IT (information technology) issues such as Trusted ID, information security, network security, network credibility, privacy protection, etc.

Description of the Related Art

With the continuous development of information technology, the cyberspace within Cyber Physical Systems has been in an anonymous and chaotic state. Service providers have little information about users, and users cannot trust each other either. Thus services that can be provided to users are limited due to this nature. As the Internet evolves into forms such as IOT (Internet of Things), ubiquitous network, cloud computing, mobile broadband and SaaS (Software as a Service), the issue has become increasingly prominent and visible, with growing negative impact. From the perspective of commercialization, the number of solutions that focus on local optimization while ignoring global efficiency and impact is also on the rise. The whole networked world is becoming more complex, confusing and costly to maintain. Achieving a unique identity authentication protocol in cyber physical system is the best way to solve the existing problems.

For many years, there have been numerous attempts at solving the problem within Cyber Physical Systems (CPS). They include but are not limited to IP (internet protocol) addressing, e163\164 standard, RFID (radio frequency identifier), URL (Uniform Resource Locator), private protocol etc. But they have not solved the problem of standardization and ubiquity. Those solutions are also highly localized and tailored towards specific types of objects and are not suited for universal deployment.

SUMMARY OF THE INVENTION

The present invention discloses a method of recognizing cyber space objects by using the natural properties of a cyber-entity (a logical entity that exists independently, and has user properties and information consumption/production properties). It has the universal and natural ability to uniquely identify a user, with functions similar to the biological gene, thus being called "cyber gene".

For example, the PC (personal computer)-based IP address can't uniquely identify a cell phone, but cell phones will be taking the roles of mobile computers in the future. Standards such as E163 and E164 can't uniquely identify a car (In the future, vehicles with computing powers will also be part of the cyber physical space). RFID (radio frequency identifier/identification) is also widely used for "identification", but it is only a tag rather than a trusted ID. Many other costs and functions are needed at the same time. But in the cyber gene-based invention and discovery, we creatively construct the GID (Global Identification), which can better solve the problems that can't be settled by RFID and other methods.

Therefore, those single-dimensional criteria can neither uniquely identify certain objects (insufficient information), nor realize unified authentication for diversified entities or even multiple forms of the same user under different conditions. In addition, it is impossible to comprehensively analyze the user behaviors and share user information. It is also difficult for cyber systems to obtain authentication from trusted organizations such as the government, resulting in the stagnant application and development of a trusted ID system.

There also exists many disadvantages with optical identification (such as barcodes) and electromagnetic identification (such as RFID) technologies, such as high TCO (Total Cost of Ownership), easy damage and wear, non-persistency and poor anti-interference. In today's world when the Internet of Things, Ubiquitous Network and Internet are required to be deeply transparent, it is an urgent issue to identify the cyber entity in a trustworthy, standardized and unique manner. This is becoming a core problem regarding information strategies in many countries.

Presently, no cyber identification and recognition technology that is applicable to all systems has been discovered. The modern CS (cyber space) applications require the mutual mapping and binding for CS and PS (Physical Space) entities. Their real identities and cyber identities are unique and corresponding to each other, thus realizing the unique identification and recognition of the trusted ID. Through practice and research on some typical cases, the present invention has discovered that the ID structure of an entity may be completely identified by using the structural patterns of a cyber-entity among the client, connection and cloud ($C^3$) data. This ID structure makes sure that there are no two identical cyber entities. By identifying and verifying the unique identity by means of a multi-dimensional matrix constructed by the intrinsic data relations, it differentiates the combination of metadata in a $C^3$ protocol stack sequence structurally from that of metadata in other $C^3$ protocol stack sequences. The technical principle as mentioned in the present invention may apply to any system that requires cyber identification and certification, and it has been proved in practical applications with typical cyber entities such as mobile, personal computer, automobile client and cyber users. Positive results have been obtained in terms of the positioning, tracking, identification, sourcing and anti-counterfeit of the identification-related "real names". It proves that the technology of the present invention is able to realize the unique identification and accurate verification of the client. In particular, when some parameters of the client is changed, such as in IMEI (International Mobile Equipment Identity) or SIM (Subscriber Identity Module) number of mobile, it is still able to identify the client from the network, thus providing comprehensive business application capabilities while integrating the positioning, privacy and credibility.

According to the metadata sets in the natural $C^3$ protocol stack of a cyber entity, the principles of free scale and the six degrees of segmentation between them, the present invention discovers a structural data relationship that distinguishes one cyberspace entity from other entities. Furthermore, the ID data set and structural data relations are used as the "digital DNA" or "cyber DNA" of the cyber entity. Through this method, we find that there are no two identical cyber entities, even if they were of the similar type of client, PC, automobile and electronic devices manufactured by the same manufacturer. This is the cyber gene principle as mentioned in the present invention.

According to cyber gene principles, more objective and extensive information can be obtained by adding various natural properties (user parameter, dynamic parameter, static parameter, client parameter, connection parameter and cloud parameter) that can be perceived by users within the connotation scope of the gene (digital DNA). The extended information may help us trace back to the cyber digital gene from the application features. We vividly compare this method to "communication fingerprint" or "cyber digital gene". It realizes the expression of application-oriented features such as objectiveness, intelligence, uniqueness, security and privacy protection.

Based on the considerations above, the present invention defines the following basic terms first:

Cyber entity: a logical entity that has independent purposes and management properties in the cyber space such as a set of data, network element, client, user profile or the combination thereof.

Protocol stack: individuals of various protocol stacks, protocol stack sequences and protocol stack sequence sets according ISO/OSI (International Organization for Standardization/Open Systems Interconnection model) system structure, and the permutation and combination thereof. The protocol stack also includes various protocol parameters and key data (such as facilities) inside all protocol stacks, and parameters for describing the protocol functions which comprise:

Cyber ID: abbreviation of identification generated according to the cyber gene principles.

IP: Internet protocol $\vec{T}_1$: an space-time independent array of data that belongs to the static parameters of the user or cyber entity.

$\vec{T}_2$: an space-time dependent array of data that belongs to the dynamic parameters of the user or cyber entity.

$\vec{T}_3$: an array of data that reflects the cyber behaviors features of the user or cyber entity.

$\vec{C}_1$: a client parameter array at the client side in CS that is related to user or cyber entity.

$\vec{C}_2$: a connection parameter array at the network side in CS that is related to the user or cyber entity. For example, information on the parameters that describes the entity uniqueness in a protocol stack regarding the features of the user or cyber entity.

$\vec{C}_3$: a cloud parameter array at the cloud side in CS that is related to the user or cyber entity.

$F_{DNA}$: a multi-dimensional matrix that constitutes the cyber structural ID, or the function value of cyber ID (Cyber ID).

This "structural ID" includes feature elements of the client, connection and cloud protocol stack sequence and some information relations expressed according to the 3×3 parameter matrix constructed up by dynamic and static parameter segmentations related to the user. First of all, the framework is a complete set because from the perspective of information communication, any cyber space activity can be described as some kind of combination and permutation of a few clients, connections and cloud protocol stacks. They may be divided into three categories that are related to the user regardless of whether they are independent or dependent on time. They are the client, connection and cloud protocol stack horizontally and Layer 1~7+Layer 8 (Application & Service) longitudinally. The information of all cyber entities falls within this scope, and the feature data in $C^3$ track of any cyber entity are all covered. The structural relations between the key metadata on different dimensions can be established in the framework. These data and relations are objective and intrinsic of the entity, therefore, the metadata that are constructed by these randomly selected ID data sets form a novel, natural multi-dimensional code block and a multi-dimensional matrix that can express the unique identity features of an entity, which is a "cyber DNA" structure, i.e. cyber ID.

Through intelligently perceiving or obtaining the known multi-dimensional property information of a user (user parameter, dynamic parameter, static parameter, client parameter, connection parameter and cloud parameter), The present invention objectively generates a unique structural identification relationship that may represent an entity according to the principle of "six degrees of segmentation" and reasonable division of the dynamic, static and user feature data structures from the "client, connection and cloud" protocol stack. The structural multi-tuple relationship is similar to the multi-dimensional code, and the difference is that its metadata are all from the entity. At the same time, these metadata and their relations are all natural and objective, which are not artificially defined, hence their inherent standardization.

The information communication (or behavior track) process and scope of any cyber entity in cyber space can only fall within the scope of $C^3$ and its combination. The multi-tuple data extracted or sampled from the dynamic and static parameters at different time and different dimensions are natural and objective. For specific cyber entity, its "function value" is verified to be static and the gene functions or gene-tuple formed based on these natural parameters constitute the objective cyber ID.

Such unique structural ID realizes features such as non-duplicability, uniqueness (overcoming the disturbance from changes of few factors [such as number and client changes]) and persistency. The cyber ID based on the user's objective element information is constructed by means of the known and intrinsic data and implicit data relations, which is vividly compared to cyber digital DNA. It realizes the objectiveness, trustworthiness, uniqueness, security, completeness and privacy functions of the user and cyber entity in the cyber space.

The overall technology of Cyber ID is divided into generation and recognition processes.

All these and other introductions of the present invention will become much clear when the drawings as well as the detailed descriptions are taken into consideration.

BRIEF DESCRIPTION OF THE DRAWINGS

For the full understanding of the nature of the present invention, reference should be made to the following detailed descriptions with the accompanying drawings in which.

Like reference numerals refer to like parts throughout the several views of the drawings.

DESCRIPTION OF THE PREFERRED EMBODIMENT

The present invention will be described more fully hereinafter with reference to the accompanying drawings, in which some examples of the embodiments of the present invention are shown. Indeed, the present invention may be embodied in many different forms and should not be construed as limitation to the embodiments set forth herein, rather, these embodiments are provided by way of example so that this disclosure will satisfy applicable legal requirements. Like numbers refer to like elements throughout.

The following specification for the implementation of the present invention is made based on the attached drawings.

1. Information Extraction and Cyber ID Generation Process

Figure 1:
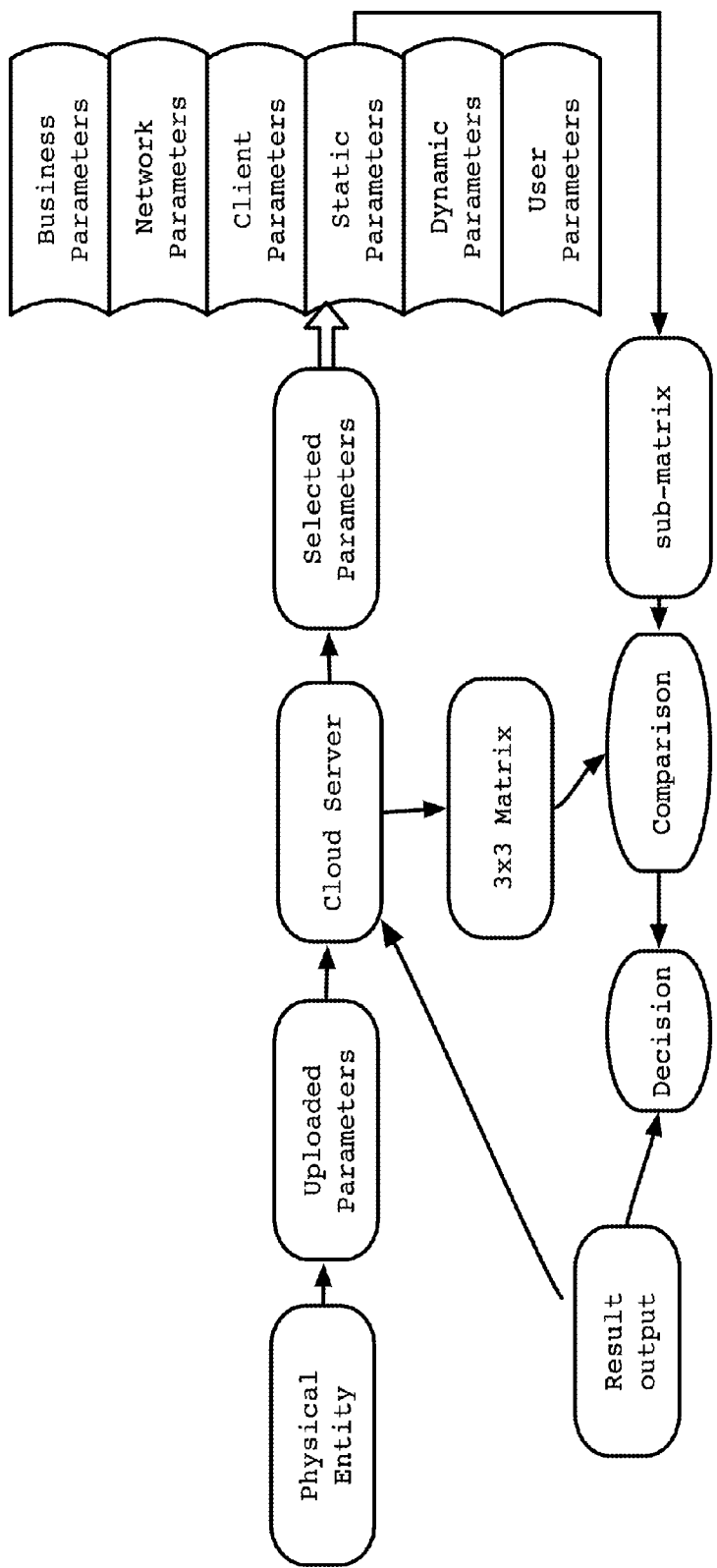
FIG. 1 discloses a flow diagram of cyber ID information extraction and ID sequence generation.

FIG. 1 gives a flow diagram of cyber ID information extraction and ID sequence generation.

Cyber ID is subject to the structure of ID function and multidimensional matrix. ID sequence is formed from a 3×3 parameter matrix (step 104) constructed by user parameters, dynamic parameters, static parameters, client parameters, connection parameters and cloud parameters (step 102) via pre-defined mapping rules. The structural logic information of cyber ID is derived from the actual data relation of five types of properties of entities inside the cyber space, i.e. "connection property, cloud property, behavior property, content property and security property". The array of static parameters that define personal features of a human being or an object does not change with time and space. For example, take the car as the user. The static parameters include VIN (vehicle identification number), engine number, sales manufacturer, sales initial mileage, etc. In case of a human user, the static information parameters include the SSN (social security number), ID information, social relations information, PIM (personal information management), CV (curriculum vitae), etc.

The array of dynamic parameters that define the user and does changes with time or space, is, for example, {name, password} pair, personal information (PI), cyber access point, access conditions, etc. The array of user parameters defining the behavioral characteristics of the user is, for example, network footprint, spending habit, position trace, etc. Array is defined by client parameters from the system and client level related to the user. For example, the address book in the client, software and hardware configuration information of the client, widget folder, etc, that indicate which kind is the object or the user, etc. Array is defined by connection parameters from the network level, including network access type, address-like information, network facilities (which can extract a great deal of unique information from the protocol stack), DPI (deep package inspect), communication strategy, position, service facilities, roaming mechanism, etc. Array is further defined by cloud parameters from the service level, indicating type of user service, QOE (Quality of Experience), security level, application environment, etc. These objective system property parameters comprise information of all aspects such as network transmission and service application.

Based on the multidimensional matrix (step 106) constructed by these objective information, this matrix is a 3×3 type multidimensional matrix. The vectors of user parameter, dynamic parameter and static parameter are the columns and the vectors of client parameters, connection parameters and cloud parameters are the rows. Client is also divided into user, dynamic and static parts. Connection is also divided into user, dynamic and static network parameters. Cloud also consists of user features, dynamic and static parameters of service level.

The parameter value of each dimensionality may be Boolean value, data set, data structure, relation and the said combination, etc. According to the feature requirements of different clients, the 3×3 matrix formed by the value and relations of the elements on each vector will be stored in the cloud server (step 108) of service client, with or without conversion. Any cyber entity may upload its dynamic parameters to the cloud server through real time online function to modify the corresponding parameters in the multidimensional matrix in a real time manner. In the meantime, the structure of cyber ID may also change with the parameters in the matrix.

Since the user parameters, dynamic parameters, static parameters, client parameters, connection parameters and cloud parameters (step 102) are all derived from the expression of a physical entity or logical entity in cyber space (such as the whole stack sequence in accordance with ISO/OSI protocol stack), they are an objective mapping of the physical entity or logical entity in the cyber world. In the logical framework of the 3×3 parameter matrix, there are many inherent, intrinsic and distinctive connections among and within data in the nine cells of the matrix. It is in these connections that a stable relation is formed gradually. We can gather these intrinsic relations among data and then apply the six degrees of segmentation principle and small world theory to form a unique data structure with certain values. Those values are then mapped to cyber space (step 104 to step 108), so the one to one projection and binding relation of the physical world and the cyber world are achieved. Consequently, attributes of cyber ID, such as objectiveness, uniqueness, security, feasibility and completeness are established.

2. Cyber ID Recognition Process

Figure 2:
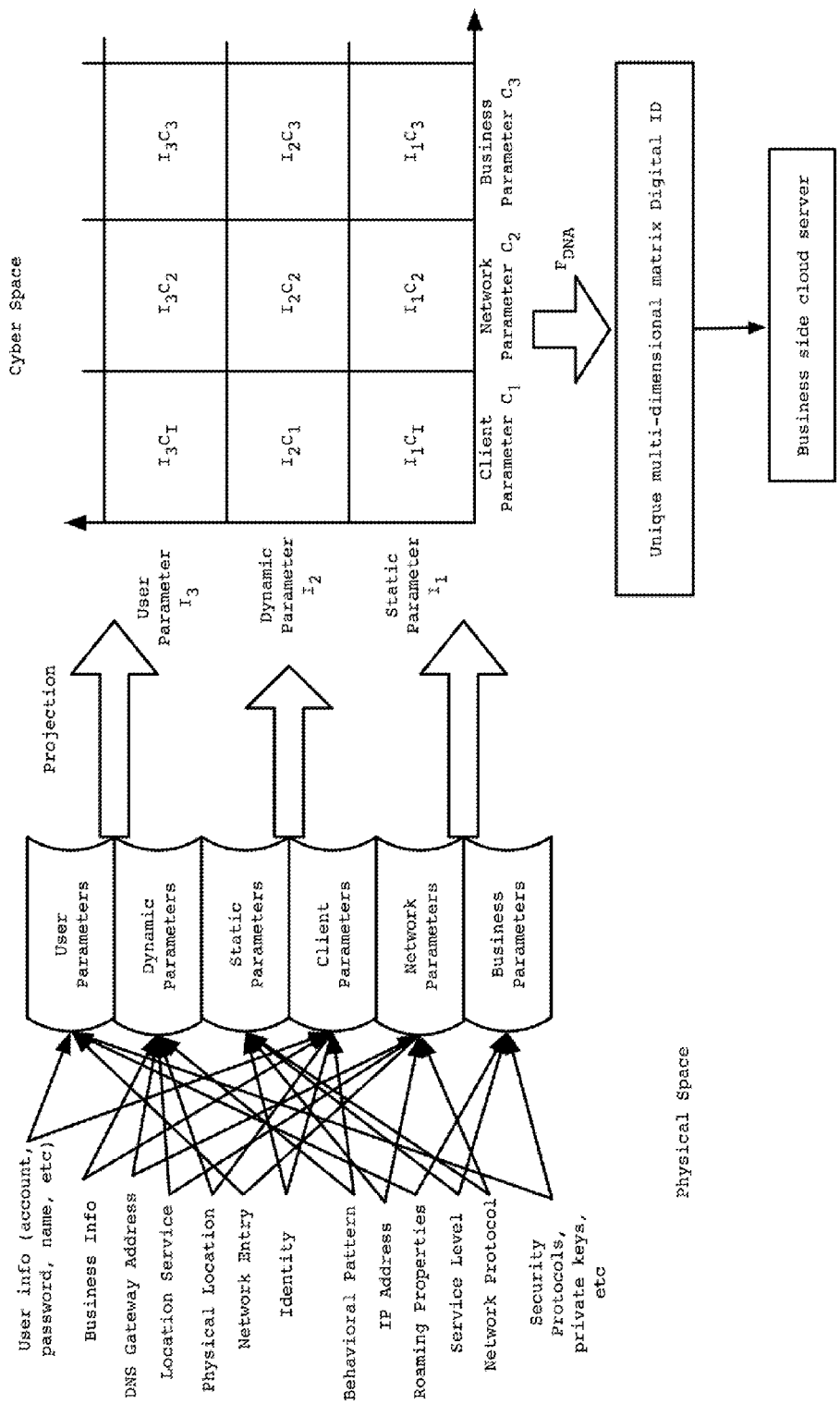
FIG. 2 is a multidimensional matrix corresponding to the cyber space formed from the mapping relation.

FIG. 2 is a multidimensional matrix that is corresponding to the cyber space formed from the mapping relation randomly sampled by a third entity. By comparing it with the multidimensional matrix of cyber ID formed from the 3×3 parameter matrix, unique ID recognition can be achieved.

Any users (202) in the physical world, either a human being or an object, can acquire and upload its parameter information such as user parameters, dynamic parameters, static parameters, client parameters, connection parameters and cloud parameters to the cloud server according to ID forming process (step 204). The cloud server takes samples of the uploaded data according to the application needs (fraud proof, anti-theft, authentication and charge, etc.) (step 208) by forming a list of all parameters (step 210). Rebuilding a multidimensional sub-matrix according to the data in the list and this sub-matrix is a certain sub-matrix of multidimensional matrix forming the cyber ID, which may be "sparse matrix" after sampling (step 212). Comparing the sampled sub-matrix with the multidimensional matrix formed through the Cyber ID forming process to achieve verification (step 216). If the sampled sub-matrix is coincident with a certain part of the multidimensional matrix formed through the generation process and stored in the cloud sever, i.e. the data and data structure in the multidimensional matrix or the relation among data matches, then matching ID will be the output (step 218). Thus, unique ID recognition process is finished. During the whole process, the data collected is complete, which can reflect the features and characters of all aspects of entity.

Further Implementation Details

The cyber ID technology disclosed by the present invention impacts identification procedure for elements in the cyber systems such as equipment, standards, the processing, transportation, management and control of information. The technologies covered include from simple technologies to advanced technologies and from cyber entity, client, connection and cloud, regardless if it is in a dynamic environment or static environment. The object of the present identification and recognition technology has the features of both CS and PS owners and has unique mapping of real name and anonymity in CS and PS, thus it is global cyber digital gene identification system in CS and informational PS.

The present invention solves the problem of cyber entity trusted ID recognition in the field of cyber and physical system (CPS), IOT (internet of things). The mapping between physical space (PS) and cyber space (CS) and the inter-mapping between real name and fake name in the PS and CS (real name and real name, real name and fake name, fake name and real name, fake name and fake name) can be achieved by using this method. It is possible to comprehensively describe the property of each cyber entity in an objective manner in CS. In the meantime, according to the actual requirements and background, the network efficiency and some online functions (for example, using the security mechanism of cyber gene technology for encryption and privacy, global network positioning, global unique identification, personalized trace and monitoring, multiple identification system (SSO: signal sign on), good faith transaction and payment, intelligent cloud computing sharing platform, etc.) may be enhanced greatly, thus forming the core foundation of all kinds of solutions in the application of next generation CPS and Internet of Things.

The cyber ID abstracted by using the structural information of cyber personalized entity in the client, connection and cloud system shares the features with biological genes. First of all, it is objective and unique. Then it is safe, has privacy protection and is intelligent. It can be used as a unique technical method to identify any entity in cyber space, and to solve the current inseparable problem of address and identification and many problems that are common in communication, which were difficult to settle before, such as ID, privacy protection, information security, good faith transaction, border invasion and cyber fraud.

In conclusion, the present invention is summarized as follows:

The present invention provides a technology for achieving the consistent and unique identification and authentication of cyber and physical space entities by extracting various physical or virtual, user's intrinsic and objective property information (user parameter, dynamic parameter, static parameter, client parameter, connection parameter and cloud parameter) from the cyber world in cyber space (CS), and a genetic digital ID (cyber ID) method based on the 3×3 parameter matrix in cyber space. The method consists of the acquisition of cyber entity structure information, generation process of cyber ID as well as the analysis, validation and identification processes of cyber ID. Anything that is in accordance with the above principle and business process and takes the following methods or thoughts belongs to the scope of this patent.

A method is disclosed to create a trusted and unique identity for a network entity from its intrinsic properties. The properties are based on the network entity's client, connection and cloud protocol stacks. The static and dynamic properties and the combination order of those protocol stacks make up the system the trusted identity is based upon.

1) Cyber Genetic Information Extraction and Cyber ID Generation Process

Cyber ID is determined by the relational structure amongst the multi-dimensional ID matrix elements. The ID sequence and matrix elements are generated by the 3×3 grid matrix that is built by user parameters, dynamic parameters, static parameters, client parameters, connection parameters and cloud parameters in accordance with specific mapping rules. The structural information of cyber ID originates from the data relations of five properties of "cyber property, service property, behavioral property, content property and security property" on the intrinsic and inherent service of the entity in cyber space. The array that defines the individual characteristics of the user or logic object and doesn't vary with time and space on the static parameter dimension is, for example, the automobile acts as the inherent parameter, including VIN, engine No., sales of manufacturers, initial mileage of sales and so on; the people act as the inherent information parameter, including user ID information, social relation information, resume and so on; cyber information parameter include the cyber type, DPI, cyber Facilities used in communication, IP address, roaming property and so on. The array that defines the user on dynamic parameter dimension is, for example, (user name, command) pair, password, service cyber facilities (such as Proxy, Email) and so on. The array that defines and reflects the users' behavioral characteristics on the user parameter dimension is, for example, consumption behavior, action path, cyber addiction, etc. It is required to define the client parameter array from the angle of system and from the client layer. For example, the client property information indicates that the user belongs to which scope of objects or which kind of users. It is required to define the connection parameter array from the cyber layer, including the cyber type, access facility, position and other cyber information. It is also required to define the cloud parameter array from the service layer to indicate the type of user service and service demand, etc. All these system property parameters contain the information in all aspects of the network. The transmission application and the information is objective.

As for the multi-dimensional matrix in the form of a 3×3 grid that is created based on these objective information, its rows consists of three dimensional vectors of user parameters, dynamic parameters and static parameters, and columns consists of three dimensional vectors of client parameters, connection parameters and cloud parameters. The parameter of each dimension contains various elements that describe the parameter and relationships among elements and relational structure. In such cases, even some of the metadata changes, the relational structure will not. Therefore, it is a composite data entity that contains a large amount of inherent information and self-characteristics. According to the characteristics of different clients and/or users, the value of element in each scope can be real values (indicated by Boolean, relation, collection, array, data or arbitral data) or "null value". The multi-dimensional arrays formed in such ways will be stored in the cloud server of the service end through the encryption and exchange. The client or user may upload his/her own dynamic parameter to the cloud server in real time online to change and synchronize the parameter in the multi-dimensional array in real time. As long as the relational structures among the key parameters do not change, the change of dynamic information will not affect its original data structure, and thus, the digital signature will not be changed. However, the "digital DNA" will be changed gradually. By making use of such a characteristic, the present invention is able to create the algorithms of trusted ID and trusted ID recognition.

2) Cyber ID Recognition Process

Any user in the physical world, whether a human user or machine, can upload their own key parameter information in the 3×3 parameter matrix to the cloud server in real time. The information is sufficient and the cloud server handles user parameters, dynamic parameters, static parameters, client parameters, connection parameters and cloud parameters in all dimensions for the uploaded data based on the demands of application (anti-counterfeiting, encryption, authentication, financial transactions, etc.), forming a list of all attributes and restoring all property relationships. And then it is required to rebuild part of the multi-dimensional sub-matrix based on the list. The sub-matrix is one sub-matrix of the multi-dimensional matrix that forms the cyber ID and it can be of sparse type. It is important to compare the sampling sub-matrix formed with the multi-dimensional matrix that is formed in the entire 3×3 parameter matrix and stored in the cloud server focusing on the structural data relation under the principles of six degrees of segmentation and Scale Free Rules. It is determined through the comparison that, if the sampling sub-matrix fits with the ID array that is formed through the 3×3 parameter matrix and stored in the cloud server in FIG. 1 on enough (sufficient and necessary) key structural information, that is, the data in multi-dimensional matrix, data structure or the relation among data fits, then the output result of determination is that the identity is either matched, or the identity isn't matched. In this way, the unique identity recognition process is completed. The entire process requires that the information collected is sufficient and can reflect the features and characteristics of the entity in all aspects with high fidelity.

Characteristics of cyber ID sequence produced by the method involved in the present invention include:

1) Objectivity and Follows Natural Standard

The scope of this patent includes the adoption of limited relational information and data structure that are implied in the invariable structure between the inherent information and information of the CP entity as the entity identification (we call it as cyber DNA ID, or cyber ID for short), and corresponding implementation techniques and methods.

The user parameters, dynamic parameters, static parameters, client parameters, connection parameters and cloud parameters that form the cyber ID contain necessary information that can embody and describe the cyber entity on the network path and the information are used in the basic communication, PIM (Personal Information Manager), communication facility, resource service facility, dynamic cache (dynamic data) and service platforms. In cyber spaces, these information parameters are objective. And the arrays and data that are constituted by these objective and natural information are also objective. For example, the parameters that come from the cyber consensus or defaulted parameters that are composed of user network mode, VPN (virtual private network) and QOS (quality of service), access information and position information are also parameters existed rather than artificially defined subjective parameters. Based on these objective parameters and the extraction of their relations, the cyber ID that is constituted through the exchange has a stable and sole ability of representing the user properties. The arrays that are composed of these parameters have the orthogonal property and are sole and objective and they are also unique. All property elements contained in the cyber ID structure are mappings from the physical information space without any artificial intervention. Therefore, the cyber ID is objective.

The client, connection and cloud ($C^3$) parameters objectively exist in the protocol stack during the information communication process, and they are also the combinations of all the information communication behaviors. The information communication process and scope of any cyber entity in the cyber space can only be within the scope of $C^3$ and its assembly. The metadata that is extracted at different time from different parameters or built by sampling is also natural and objective. As for the specified cyber entity, its "functional value" (data and its structural relation in array) is verified as unchangeable. And the objective cyber ID is composed of these genetic variables and natural parameters.

2) Uniqueness

Cyber ID can be regarded as a combination of intrinsic and objective properties of an information entity. Mathematically, it is a function integrating various metadata and features, metadata combination, combinational relationships, data structure properties and key properties of different time stamps and space stamps of a silicon-based organism (the general term of various electronic chip devices with intelligent control mechanism). Information of all these functions is derived from the organism's natural existence. The structural relations of data are unique (because the multi-dimensional identification is adopted and the principle of six degrees of segmentation is abided by), therefore, no two entities are identical. The uniqueness also enhances the anti-interference capacity of ID system, since false positive verification will not occur due to matching properties on single criteria.

3) Security

The security of cyber ID is determined by unique ID functions and matrix transformations. Due to the uniqueness of cyber ID, it is impossible to speculate different 6-degree relation sequences, and it is also uncertain to choose which six degrees. They have different time and space stamps. The combinational elements here are the "client, connection and cloud" protocol stack, and all metadata of the cyber entity are derived from $C^3$. But the complexity of determining the quantity and order of metadata and the randomness of selecting 6 from N exceeds even 256-bit RSA encryption. At the same time, the cyber ID sequence can only obtain the same transformation matrix in the target user under the condition that it has the information on the user's own verified and matched cyber ID. For non-target user or business, such ID can't be identified, and it is unknown and unavailable. Therefore, forced authorization is impossible.

Therefore, the cyber ID-based encryption is safe for both the users and businesses, and it guarantees the security of information communication and exchange.

The cyber ID has the unique and objective features similar to biological DNA, and different clients and businesses have different ID sequence structures (structural relation features)—a gene code. Only the users or businesses that have their own gene code can have an access to the cyber resources, which are unknown and unavailable to the outside world and can't be separated from the entity. Just like no one can authorize their own biometric data for other people to use.

4) Privacy

The uniqueness and security of the cyber gene can't be authorized, which is different from password or other forms. It can not be transferred, copied or plagiarized, thus having advantages in protecting the privacy, as what is said, "My information is in my hand".

The information included in the cyber ID is self-information, and the recovery and verification of ID can only be obtained by users under the conditions of self-existence. It is not some known or defined multi-dimensional code. Based on such objective, portable and unique cyber ID, users can use their own information only when they are their true self. Only then are they allowed to proceed to use those information for application purposes.

Other users or business cannot identify the cyber ID of the non-target client since they have different transformation structures, and the target client has the freedom to accept or reject sharing services with such non-target client. Different types of businesses can be integrated via the cloud computing means to cooperatively complete different tasks. At the same time, such process is invisible and shielded to the client. Therefore, with the cyber ID-based objective, unique and safe identification, the business end can perceive the user's behaviors and environment to achieve exclusivity, and also better protect the user's private information.

The objectiveness, uniqueness, security and privacy of cyber ID are intertwined with each other. Objectiveness is a basis for realizing the uniqueness feature, because the uniqueness of cyber ID depends on the objectiveness and natural standard of data collected from the physical world. The objectiveness and uniqueness also determine the security of ID. These three features also determine the inseparability between ID and the user, i.e. the intrinsic privacy protection feature.

5) Trustworthiness

Cyber ID is obtained by extracting the information and metadata of the known $C^3$ protocol stack sequence. A unique, multi-dimensional and objective information array can be constructed by means of the user's intrinsic basic communication information, PIM information, communication facility information, resource information, dynamic cache information and user behavior information.

The trustworthiness and reliability of Cyber ID are derived from previously mentioned objectiveness, uniqueness, security, privacy and accompanying and also from the non-mutability of the relational structure and objective data. In addition, based on various information security algorithms available, the user's cyber DNA can be rapidly obtained and then compared by means of the mathematical modeling, data mining and cluster analysis, mode identification, new internet technology and cloud computing technology. This process of generating and using cyber DNA is also a trustworthy technology.

6) Solution Completeness (Sufficiency and Necessity)

The cyber gene ID is a subset of the information set of a cyber entity within the scope of $C^3$ (client, connection and cloud protocol stack) that covers the user information, dynamic information and static information of the user or cyber entity. Any trusted and self ID information and metadata must fall within such scope. Therefore, the expression of the 3×3 parameter matrix is sufficient. In cyber space, any information involving the exchange and communication is certainly from the protocol stack of some entity, because the network space is consisted of a lot of protocol stacks and protocol stack sequences, with the information flows between and inside the protocol stacks. The cyber gene model is a set of the abstract client, connection and cloud protocol stack. Therefore, it is a complete set, which is both necessary and sufficient.

In addition, for any cyber ID to remain trustworthy and unique, it must conform to the features of objectiveness, uniqueness, addressability, security and privacy. Thus these features are also necessary. Information of all functions, such as the metadata set, "silicon organism" feature metadata, structural relations of data, and optimized information of different time and space scales, are all objective, and the "function value" will not change according to the data source and combination conditions. Therefore, the multi-dimensional vector constructed by such method may uniquely and fully identify the users.

In summary, the present invention comprises the following disclosures:

A Cyber Identification (ID) system that achieves fully secure, unique and consistent identification and authentication of entities within a Cyber-Physical Space (CPS), the aforementioned system comprising:

a) A form of identification based on intrinsic properties of the aforementioned CPS entity, b) Subsystem of the aforementioned CPS entity described by a combination of six properties including client, connection, cloud, user, static and dynamic properties, based on network theories and cyberspace structures, c) Subsystem constructed from parameters of the aforementioned CPS entity: user parameters, dynamic parameters, static parameters, client parameters, connection parameters and cloud parameters, wherein the aforementioned parameters are unique to the aforementioned entity, much like biological DNA and thus impossible to counterfeit, d) An identification unit composed of the aforementioned properties of the aforementioned CPS entity's hardware, communication protocol stacks, client level software and relationships wherein no two separate the aforementioned CPS entities can have the exact same the aforementioned identification unit, e) An operation pattern for the aforementioned CPS entity remaining relatively consistent and without significant change to the aforementioned CPS entity's hardware or network protocol stack, f) A combination of intrinsic and objective properties of an information entity that is a function integrating various metadata and features, metadata combination, combinational relationships, data structure properties and key properties of different time stamps and space stamps of a silicon-based organism which is the general term of various electronic chip devices with intelligent control mechanism, wherein information of the aforementioned functions is derived from the aforementioned organism's natural existence, g) A security unit of the aforementioned Cyber IDs determined by unique identification (ID) functions and matrix transformations, which is largely related to an uniqueness of the aforementioned Cyber ID and a method of the aforementioned Cyber ID generation to ensure user and business privacy, h) A complete CPS entity identification subsystem which is a subset of information set of a network entity within scope of $C^3$ (client, connection and cloud) protocol stack that cover user information, dynamic information and static information of a cyber entity, and can fully and uniquely identify the aforementioned CPS entities and serve as a standalone identification protocol, and i) A unique structural relationship of data wherein a multi-dimensional identification is adopted and a principle of six degrees of separation is abided by to ensure no two entities are identical.

The aforementioned Cyber ID includes adoption of limited relational information and data structure that are implied in the invariable structure of inherent information of the aforementioned CPS entity as an entity identification, further comprising:

a) The aforementioned client, connection and cloud ($C^3$) parameters objectively existing in a protocol stack during information communication process, and also in combination of all information communication behaviors, wherein the aforementioned information communication process and scope of any the aforementioned CPS entity in a cyber space can only be within scopes of the aforementioned $C^3$ and its assembly, and the aforementioned metadata extracted at different time from different parameters or built by sampling is also natural and objective, and the aforementioned objective Cyber ID is composed of the aforementioned genetic variables and natural parameters, and b) The aforementioned user parameters, dynamic parameters, static parameters, client parameters, connection parameters and cloud parameters used to generate the aforementioned Cyber ID containing necessary information that can embody and describe the aforementioned CPS entity on network path and the aforementioned information used in basic communication, PIM (Personal Information Manager), communication facility, resource service facility, dynamic cache (dynamic data), user behavior information and service platforms, wherein in the aforementioned cyber spaces, the aforementioned information parameters are objective, and arrays and data constituted by the aforementioned objective and natural information are also objective.

The aforementioned Cyber ID has a stable and sole ability of representing user properties, and the aforementioned arrays composed of the aforementioned parameters have an orthogonal property and are sole, objective and also unique.

The aforementioned property elements contained in the aforementioned Cyber ID structure are mappings from physical information space without any artificial intervention, and therefore the aforementioned Cyber ID is objective.

The aforementioned Cyber ID can be obtained by extracting the aforementioned information and the aforementioned metadata of the aforementioned $C^3$ protocol stack sequence.

The aforementioned Cyber ID can also be obtained and compared by means of mathematical modeling, data mining and cluster analysis, mode identification, new Internet technology and cloud computing technology in the aforementioned CPS entity.

The aforementioned metadata of the aforementioned CPS entity are derived from the aforementioned $C^3$ protocol stack, and the complexity of determining quantity and order of the aforementioned metadata and the randomness of selecting six from N exceeds even a 256-bit RSA (by Ron, Shamir and Adleman at MIT) encryption.

The aforementioned Cyber ID sequence can only be obtained by the same transformation matrix in a target user with information of user's own verified and matched the aforementioned Cyber ID The aforementioned Cyber ID model is a set of abstract client, connection and cloud protocol stacks.

The aforementioned information entity containing the aforementioned metadata, the aforementioned silicon organism, the aforementioned data structure and optimized information of the aforementioned different time and space stamps, are all objective, and will not change according to data source and combination conditions.

The aforementioned $C^3$ protocol stack can be integrated into traditional network protocol stack.

A method to generate a unique Cyber ID (Identification) for any objects within a Cyber-Physical Space (CPS), the aforementioned method comprising:

a) The aforementioned Cyber ID determined by a relational structure amongst multi-dimensional ID (identification) matrix elements generated by a 3×3 matrix built by specific mapping rules and user parameters, dynamic parameters, static parameters, client parameters, connection parameters, and cloud parameters extracted from a cyber entity, b) Columns of the aforementioned 3×3 identity matrix consisted of client parameters, connection parameters and cloud parameters, and rows of the aforementioned matrix consisted of user parameters, dynamic parameters and static parameters, wherein the aforementioned relationship data is stored within the aforementioned 3×3 matrix for different types of parameters, c) Choosing parameters from the aforementioned 3×3 matrix which is relatively unique to the aforementioned cyber entity, and also has relatively unique relations of its various attributes to construct an internal structure relationship diagram for the aforementioned cyber entity optimized for searching and identification using six-degrees of separation principal, d) Structural information of the aforementioned Cyber ID originating from data relationship of network properties, service properties, behavioral properties, content properties and security properties of the aforementioned cyber entity, and the aforementioned structural relationship data being a crucial part to the aforementioned Cyber ID which reinforces the aforementioned Cyber ID's capability of uniquely identifying the aforementioned cyber entities, e) The aforementioned Cyber ID possessing a high degree of privacy and security guarantee due to multiplicity of composing data and relations, complexity of structural data and non-symmetrical information, f) The aforementioned 3×3 parameter matrix of the aforementioned cyber entity used to generate a unique and secure the aforementioned Cyber ID by using specific mapping and transformation rules based on principal of Six-degrees-of-Segmentation, and being practically impossible to brute force matrix transformation combination due to vast number of possible combinations of metadata, wherein the aforementioned transformation sequence has security level exceeds even that of 256-bit RSA (by Ron, Shamir and Adleman at MIT) encryption, and g) Generated the aforementioned Cyber ID be paired with the aforementioned entity and be stored in a cloud server for future references, identification and authorization purposes.

The aforementioned multiple parameters of same the aforementioned cyber entity contain same intrinsic structural relationship to ensure resulting the aforementioned Cyber IDs consistent and valid throughout life cycle of the aforementioned cyber entity.

The aforementioned Cyber ID is generated from intrinsic properties of the aforementioned cyber entity and always valid and usable despite changes on network cloud even though comparison or generation algorithm may vary.

The aforementioned structural information of the aforementioned Cyber ID contains self-information, and only users under the conditions of self-existence can perform recovery and verification of the aforementioned Cyber ID.

The aforementioned Six-degrees-of-Segmentation comprises algorithm randomly choosing six out of many metadata and relationships from the aforementioned 3×3 parameter matrix.

A method to recognize, match and authenticate a Cyber ID (identification) to achieve identification and authentication of a Cyber-Physical Space (CPS) entities, the aforementioned method comprising:

a) Any users in physical world, whether human or machine, being able to upload own key parameter information in the form of a 3×3 parameter matrix to a cloud server in real-time, b) The aforementioned cloud server forming a list of all attributes and restoring partially key parameter relationships of the aforementioned entity from the aforementioned uploaded 3×3 parameter matrix, c) The aforementioned cloud server building a multidimensional sub-matrix from the aforementioned parameters collected, and this re-build process utilizing a stored matrix transformation sequence of the aforementioned CPS entity, wherein the aforementioned resulting sub-matrix will then be compared to the aforementioned original 3×3 parameter matrix of the aforementioned entity stored in the aforementioned cloud server, and the aforementioned comparison will be focused on structural data relationships under principles of six degrees of separation and Scale Free Rules, with results returned as either positive or negative, d) Performing multiple iterations of generation and comparison to ensure validity of identification, and each iteration following above same procedure, and e) Speed of recognition subject to quality and effectiveness of information contained in the aforementioned sub-matrix.

The aforementioned Cyber ID can not be authenticated to non-target clients since they have different transformation structures, and a target client has full freedom to accept or reject sharing services with the aforementioned non-target client.

The aforementioned cloud server can be a mobile wireless cloud server in either mobile networks or wireless access networks.

The above specification and claims, as well as the ideas and logic process, specific operation and implementation concept constitute the core of this patent and the overall scope of claims.

The system and method of the present invention are not meant to be limited to the aforementioned experiment, and the subsequent specific description utilization and explanation of certain characteristics previously recited as being characteristics of this experiment are not intended to be limited to such techniques.

Many modifications and other embodiments of the present invention set forth herein will come to mind to one ordinary skilled in the art to which the present invention pertains having the benefit of the teachings presented in the foregoing descriptions. Therefore, it is to be understood that the present invention is not to be limited to the specific examples of the embodiments disclosed and that modifications, variations, changes and other embodiments are intended to be included within the scope of the appended claims. Although specific terms are employed herein, they are used in a generic and descriptive sense only and not for purposes of limitation.

What is claimed:

1. A method for acquisition of cyber entity information to generate an 3×3 multidimensional parameter matrix to be stored in an cloud server, said method comprising:

a) uploading array of static parameters that define personal features of a human being or an object not changing with time and space including VIN (vehicle identification number), engine number, sales manufacturer, sales initial mileage, SSN (social security number), ID (identification) information, social relations information, PIM (personal information management), CV (curriculum vitae) to said cloud server in real time, b) uploading array of dynamic parameters that define user, changing with time or space, including, name and password pair, personal information (PI), cyber access point, access conditions, proxy, e-mail to said cloud server in real time, c) uploading array of user parameters that define behavioral characteristics of user including network footprint, spending habit, position trace, consumption behavior, action path, cyber addiction to said cloud server in real time, d) uploading array of client parameters from system and client level related to user including address book of client, software and hardware configuration information of client, and widget folder that indicate which kind is object or user to said cloud server in real time, e) uploading array of connection parameters from network level including network access type, address information, IP (internet protocol) address, roaming property, network facilities which can extract a great deal of unique information from protocol stack, access facility, DPI (deep package inspect), communication strategy, position, service facilities, roaming mechanism to said cloud server in real time, and f) uploading array of cloud parameters from service level indicating type of user service, service demand, QOE (quality of experience), security level, application environment to said cloud server in real time.

2. The method as recited in claim 1, wherein said client is also divided into user, dynamic and static parts, said connection is also divided into user, dynamic and static network parameters and said cloud also consists of user features, dynamic and static parameters of service level.

3. The method as recited in claim 1, wherein said cyber entity uploads its dynamic parameters to cloud server through real time online function to modify corresponding parameters in said multidimensional parameter matrix in a real time manner, and parameter value of each dimensionality includes Boolean value, data set, data structure, relation and the combination.

4. The method as recited in claim 1, wherein said cyber entity with trusted ID recognition in the field of cyber and physical system (CPS) solves mapping between physical space (PS) and cyber space (CS) and inter-mapping between real name and fake name in said PS and said CS.

5. The method as recited in claim 4, wherein property of each said cyber entity in an objective manner in said CS includes some online functions of encryption and privacy, global network positioning, global unique identification, personalized trace and monitoring, multiple identification system, good faith transaction and payment, intelligent cloud computing sharing platform in application of next generation said CPS and Internet of Things (IoT).

6. The method as recited in claim 1, wherein a trusted and unique identity for a network entity is from intrinsic properties which are based on said network entity's client, connection and cloud protocol stacks from static and dynamic properties and the combination order of said protocol stacks.

7. The method as recited in claim 1, wherein said parameter of each dimension contains various elements that describe said parameter and relationships among said elements and relational structure so that even some of metadata changes, said relational structure will not.

8. The method as recited in claim 7, wherein value of said elements in each scope is real value indicated by Boolean, relation, collection, array, data or arbitral data, or null value, according to characteristics of different clients and/or users.

9. The method as recited in claim 7, wherein as long as said relational structure among key parameters does not change, the change of dynamic information will not affect its original data structure and thus digital signature will not be changed.

10. The method as recited in claim 1, wherein said client or user may uploads his/her own dynamic parameter to cloud server in real time online to change and synchronize said parameter in multidimensional array in real time.

11. The method as recited in claim 1, wherein said parameters that come from cyber consensus or defaulted parameters that are composed of user network mode, VPN (virtual private network) and QoS (quality of service), access information and position information are also parameters existed rather than artificially defined subjective parameters.

12. The method as recited in claim 1, wherein based on objective said parameters and extraction of their relations, a cyber ID that is constituted through exchange has a stable and sole ability of representing user properties.

13. The method as recited in claim 1, wherein said arrays that are composed of said parameters have orthogonal property and are sole, objective and unique.

14. The method as recited in claim 1, wherein said client, said connection and said cloud (C3) parameters objectively exist in said protocol stack during information communication process, and they are also the combinations of information communication behaviors, and said information communication process and scope of any said cyber entity in said cyber space can only be within the scope of said C3 and its assembly.

15. The method as recited in claim 1, wherein any user in physical world, whether a human user or machine, can upload own key parameter information in said 3×3 multi-dimensional parameter matrix to said cloud server in real time based on demands of applications including anti-counterfeiting, encryption, authentication and financial transactions, forming a list of all attributes and restoring all property relationships and then it is required to rebuild part of multidimensional sub-matrix based on said list.

16. The method as recited in claim 12, wherein said cyber ID is a function integrating various metadata and features, metadata combination, combinational relationships, data structure properties and key properties of different time stamps and space stamps of a silicon-based organism which is the general term of various electronic chip devices with intelligent control mechanism.

17. The method as recited in claim 12, wherein said cyber ID is generated from intrinsic properties of said cyber entity and always valid and usable despite changes on network cloud even though comparison or generation algorithm may vary.

18. The method as recited in claim 3, wherein said cloud server can be a mobile wireless cloud server in either mobile networks or wireless access networks.

19. The method as recited in claim 1, wherein said parameters of same said cyber entity contain same intrinsic structural relationship to ensure resulting cyber IDs consistent and valid throughout life cycle of said cyber entity.

* * * * *